(12) United States Patent
McLoughlin et al.

(10) Patent No.: US 9,090,202 B2
(45) Date of Patent: Jul. 28, 2015

(54) CONVERTIBLE EMERGENCY LIGHTING APPARATUS HAVING INTERCHANGEABLE SCENE ILLUMINATION AND TRAFFIC CONTROL CONFIGURATIONS

(71) Applicants: John E. McLoughlin, Hauppage, NY (US); Neocles G. Athanasiades, Setauket, NY (US); Kiam Meng Toh, St. James, NY (US)

(72) Inventors: John E. McLoughlin, Hauppage, NY (US); Neocles G. Athanasiades, Setauket, NY (US); Kiam Meng Toh, St. James, NY (US)

(*) Notice: Subject to any disclaimer, the term of this patent is extended or adjusted under 35 U.S.C. 154(b) by 199 days.

(21) Appl. No.: 13/923,775

(22) Filed: Jun. 21, 2013

(65) Prior Publication Data
US 2014/0376216 A1    Dec. 25, 2014

(51) Int. Cl.
*G08B 21/00* (2006.01)
*B60Q 1/00* (2006.01)
*F21S 9/02* (2006.01)
*F21V 9/08* (2006.01)
*G08G 1/095* (2006.01)
*G08G 1/0955* (2006.01)
*F21V 17/00* (2006.01)
*F21W 111/02* (2006.01)
*F21W 131/10* (2006.01)

(52) U.S. Cl.
CPC ... *B60Q 1/00* (2013.01); *F21S 9/02* (2013.01); *F21V 9/08* (2013.01); *G08G 1/095* (2013.01); *G08G 1/0955* (2013.01); *F21V 17/002* (2013.01); *F21W 2111/02* (2013.01); *F21W 2131/10* (2013.01)

(58) Field of Classification Search
USPC ............... 340/907, 908, 908.1; 362/227, 234, 362/236, 362
See application file for complete search history.

(56) References Cited

U.S. PATENT DOCUMENTS

2013/0106619 A1* 5/2013 Williams ...................... 340/908

* cited by examiner

*Primary Examiner* — Jeffery Hofsass
(74) *Attorney, Agent, or Firm* — Louise S. Heim

(57) ABSTRACT

A combination scene lighting and traffic control system includes a scene illumination apparatus for illuminating an emergency scene, and a detachable adapter for converting the illumination apparatus into a traffic light. The scene illumination apparatus includes at least two separately actuatable lighting elements within a tripod-mounted housing. A control device allows simultaneous actuation of both lighting elements when maximum illumination is desired or actuation of a single element if less illumination is desired. The adapter holds two different colored filters, each of which overlies a different one of the lighting elements when the adapter is secured to the illumination apparatus, so that one colored light will be visible to approaching motorists when a first of the lighting elements is actuated and a different colored light will be visible when a second of the lighting elements is actuated. The filter colors are preferably associated with traditional traffic control colors such as red and green, so that approaching motorists will stop or go depending on which color light is visible.

20 Claims, 1 Drawing Sheet

CONVERTIBLE EMERGENCY LIGHTING APPARATUS HAVING INTERCHANGEABLE SCENE ILLUMINATION AND TRAFFIC CONTROL CONFIGURATIONS

CROSS-REFERENCE TO RELATED APPLICATIONS

This application claims the benefit of U.S. Provisional Application No. 61/663,596, filed on Jun. 24, 2012.

BACKGROUND

1. Field of the Invention

This invention relates to the field of electrical lighting.

More particularly, the invention relates to a portable emergency lighting system for use at the scene of an accident, fire, or other disaster.

In a further and more specific aspect, the invention concerns a portable emergency lighting apparatus that is convertible from a scene illumination mode to a traffic control mode.

2. Description of the Prior Art

Emergency responders must be able to see well and move quickly. Their already difficult jobs become more challenging when darkness hampers their ability to find and rescue disaster victims, or when heavy traffic slows them down. Typically, they solve the first problem with hand-held, vehicle-mounted, or free-standing emergency lights that illuminate the disaster scene. They often solve the second problem by assigning personnel to direct traffic around or away from the disaster area, either by using hand signals or with the help of flags, traffic cones, or flares. Unfortunately, small rescue teams do not always have enough personnel to devote to this task. Furthermore, approaching motorists often ignore or fail to notice the traffic controllers and continue to drive recklessly through the emergency area, endangering themselves and others, and impeding the entire rescue operation.

Accordingly, it is an object of the present invention to provide a combination scene lighting and traffic control system for providing illumination during night-time emergencies and producing traffic control signals during roadside emergencies.

SUMMARY OF THE INVENTION

Briefly, to achieve the desired objects of the invention, an emergency lighting system is provided with an illumination apparatus having at least two independently actuatable lighting elements and an adapter for mounting a different colored filter over each lighting element. When the adapter is not in place, the system is in "scene illumination mode" whereby the amount of illumination can be controlled by varying the number of lighting elements that are actuated. When the adapter is in place, the system is in "traffic control mode" whereby the lighting elements are actuated one at a time to produce different colored signals corresponding to different traffic commands.

BRIEF DESCRIPTION OF THE DRAWINGS

Objects and advantages of the instant invention will become readily apparent to those skilled in the art from the following detailed description of the preferred embodiments thereof taken in conjunction with the drawings in which.

DETAILED DESCRIPTION OF THE PREFERRED EMBODIMENT

Figures 1, 2:
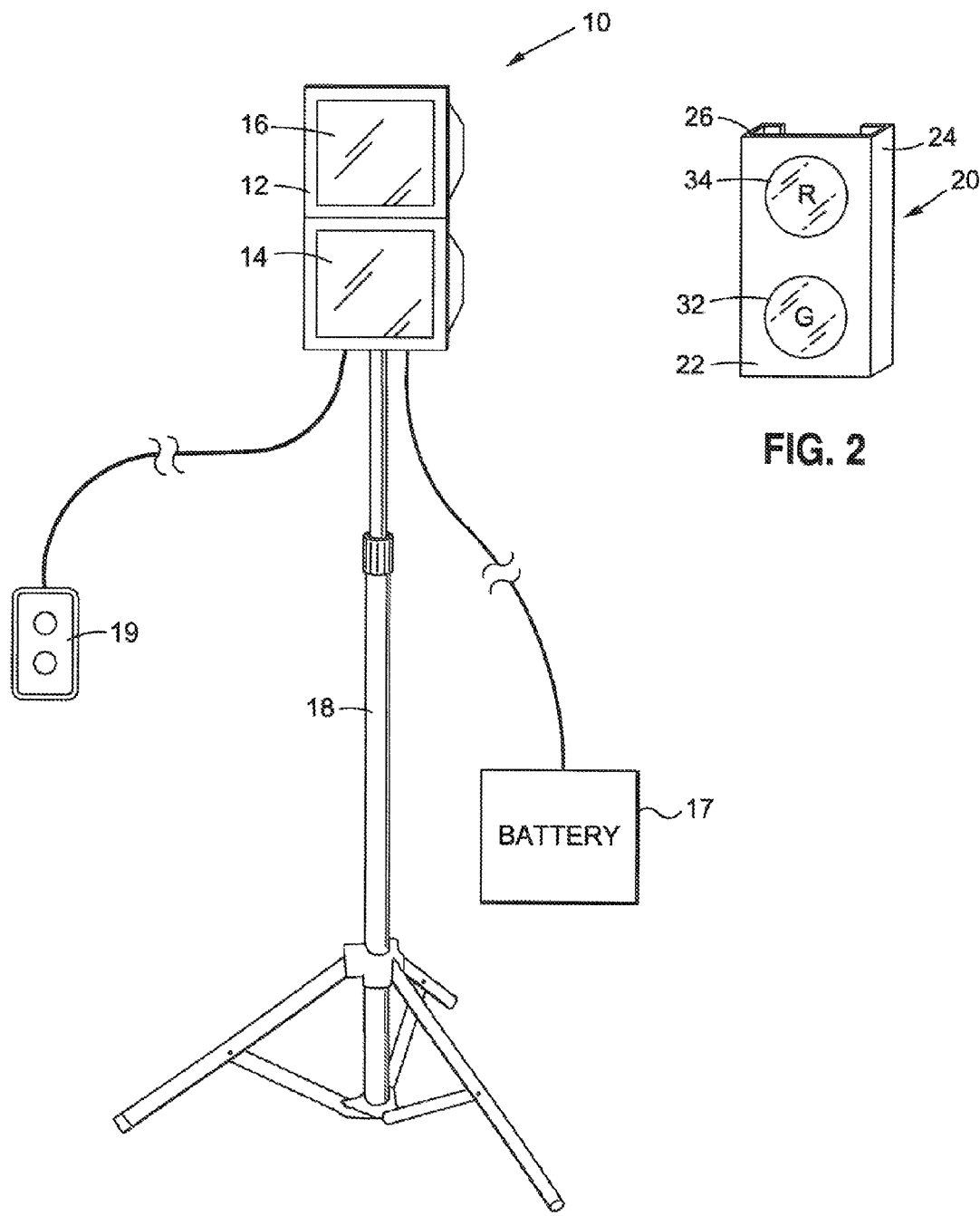
FIG. 1 is a schematic view showing an emergency scene illumination apparatus according to the present invention.
FIG. 2 is a perspective view showing an adapter for converting the emergency scene illumination apparatus to a traffic control light.

Turning now to the drawings, attention is first directed to FIG. 1, which shows the emergency scene illumination apparatus of the present invention indicated in its entirety by the numeral 10.

The apparatus 10 comprises a lamp housing 12 containing at least two separately controllable lighting elements 14 and 16, preferably positioned one above the other. The lighting elements may be any type of conventional light sources such as light emitting diodes (LEDs), high intensity discharge (HID) lamps, or quartz halogen bulbs that are powered by a low voltage battery 17. The lamp housing 12 is mounted on an adjustable tripod 18 that can be carried in the trunk of a rescue vehicle or police car, and set up quickly to provide illumination at the scene of an emergency such as a fire or traffic accident.

A remote controller 19 is provided for actuating the lighting elements 14 and 16 independently of one another. Both elements 14, 16, may be illuminated simultaneously when there is a need for maximum light, or either element can be illuminated alone when less light is needed and/or it is desirable to save energy. The controller 19 may be wired to the apparatus 10 as shown, or it may be a wireless (ie. radio) controller (not shown).

Turning now to FIG. 2, an adapter 20 is provided for converting the illumination apparatus 10 to a traffic light. The adapter 20, which may be made of metal, plastic, or other suitable material, comprises a front surface 22, two side walls 24, 26 that extend rearwardly from opposite sides of the front surface 22, and a pair of rear flanges 28, 30 that extend inwardly from the rear edges of the side walls 24, 26. A pair of openings 32, 34 is formed in the front surface 22, preferably one above the other. Each opening 32, 34, contains a different colored filter. For instance, the lower opening 32 may include a green filter for indicating "go," and the upper opening 34 may include a red filter for indicating "stop."

The adapter 20 is configured to be slid over the lamp housing 12 in such a way that the lower opening 32 is aligned with the lower light element 14 and the upper opening 34 is aligned with the upper light element 16. Thus, the green light will pass through the green filter 32 whenever the lower light element 14 is actuated and red light will pass through the red filter 34 whenever the upper light element 16 is actuated, enabling an operator to direct traffic simply by alternately switching the lower and upper light elements 14, 16 on and off. Alternatively, the apparatus 10 can be programmed to operate automatically, with each light being illuminated for a selected length of time.

Various modifications of the invention will readily occur to the skilled practitioner. For instance, the shape of the lamp housing 12 and the adapter 20 need not be rectangular as shown, but may be rounded or any other configuration. Furthermore, the number of light elements may be varied as desired. For instance, it may be desirable to provide three light elements and three corresponding openings in the front surface 22 of the adapter of 20, and to provide a yellow filter between the green and red filter 32, 34, to more closely resemble a conventional traffic light. Additionally or alternatively, it may desirable to add indicia such as arrows or words such as "stop," caution," or "go" to the front surface of each filter, or to use colors other than red, yellow, and green, or to position the light elements in other configurations besides directly above and below one another. To the extent that such modifications do not depart from the spirit of the invention, they are intended to be included within the scope thereof.

Having fully described the invention in such clear and concise terms as to enable those skilled in the art to understand and practice the same, the invention claimed is:

1. An emergency lighting system comprising:
   a) a scene illumination apparatus including
      a lamp housing containing at least two separately actuatable lighting elements for illuminating an emergency scene; and
      a controller for simultaneously actuating both lighting elements if maximum illumination is desired or for actuating only one element if less illumination is desired; and
   b) an adapter detachably securable to said scene illumination apparatus for converting said apparatus to a traffic light.

2. The system according to claim 1, wherein said adapter comprises:
   a) a front surface having at least two openings;
   b) a first colored filter mounted in a first of said openings;
   c) a second colored filter, differently colored than said first colored filter, mounted in a second of said openings;
   d) mounting means coupled to said front surface and configured to position said first colored filter over a first of said lighting elements and said second colored filter over a second of said lighting elements.

3. The system according to claim 2, wherein said mounting means comprises a set of flanges coupled to said front surface and configured to slidably engage said lamp housing.

4. The system according to claim 1, further comprising collapsible support means for allowing said illumination apparatus to be easily transported in an emergency vehicle and quickly set up at an emergency scene.

5. The system according to claim 4, wherein said collapsible support means comprises a tripod.

6. An emergency scene lighting system comprising:
   a) an illumination apparatus having at least two independently actuatable lighting elements;
   b) a power source for delivering power to said illumination apparatus;
   c) a controller for selectively actuating said lighting elements;
   d) an adapter having at least two openings;
   e) a first colored filter mounted in a first of said openings;
   f) a second colored filter, differently colored than said first colored filter, mounted in a second of said openings; and
   g) mounting means for detachably securing said adapter to said illumination apparatus such that said first colored filter aligns with a first of said lighting elements and said second colored filter aligns with a second of said lighting elements.

7. The system according to claim 6, wherein said illumination apparatus comprises:
   a) an adjustable tripod; and
   b) a lamp housing mounted on said adjustable tripod, said housing containing said lighting elements.

8. The system according to claim 6, wherein said lighting elements comprise light emitting diodes.

9. The system according to claim 6, wherein said lighting elements comprise high intensity discharge lamps.

10. The system according to claim 6, wherein said lighting elements comprise quartz halogen bulbs.

11. The system according to claim 6, wherein said power source is a low voltage battery.

12. The system according to claim 6, wherein:
   a) said adapter comprises a front surface including said openings; and
   b) said mounting means comprises a set of flanges coupled to said front surface and configured to slidably engage said lamp housing.

13. The system according to claim 12, wherein said flanges are integral with said front surface.

14. The system according to claim 6, wherein said first color corresponds to a first traffic control color associated with a "stop" command.

15. The system according to claim 6, wherein said second color corresponds to a second traffic control color associated with a "go" command.

16. The system according to claim 6, wherein said controller is a remote-control device for enabling a user to selectively actuate the lighting elements from a considerable distance.

17. The system according to claim 6, wherein said controller is hard-wired to said illumination apparatus.

18. The system according to claim 6, wherein said controller is wirelessly coupled to said lighting apparatus.

19. The system according to claim 6, wherein said controller comprises programmable means for automatically actuating said lighting elements in an alternating sequence whereby each element is illuminated for a selected length of time.

20. The system according to claim 3, wherein said flanges are integral with said front surface.

* * * * *